United States Patent
Miyamoto et al.

(10) Patent No.: US 9,406,965 B2
(45) Date of Patent: Aug. 2, 2016

(54) FUEL CELL MODULE

(71) Applicant: MITSUBISHI HITACHI POWER SYSTEMS, LTD., Kanagawa (JP)

(72) Inventors: Koji Miyamoto, Tokyo (JP); Masahiro Mihara, Tokyo (JP); Norihisa Matake, Tokyo (JP); Takeshi Matsuo, Tokyo (JP); Masaki Yasunaga, Nagasaki (JP); Tomonori Souda, Nagasaki (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 306 days.

(21) Appl. No.: 13/770,354

(22) Filed: Feb. 19, 2013

(65) Prior Publication Data
US 2013/0216929 A1 Aug. 22, 2013

(30) Foreign Application Priority Data

Feb. 20, 2012 (JP) ................................. 2012-034326
Feb. 20, 2012 (JP) ................................. 2012-034328

(51) Int. Cl.
*H01M 8/24* (2016.01)
*H01M 8/2485* (2016.01)
*H01M 8/12* (2016.01)

(52) U.S. Cl.
CPC ............ *H01M 8/2485* (2013.01); *H01M 8/243* (2013.01); *H01M 2008/1293* (2013.01); *Y02E 60/50* (2013.01); *Y02E 60/525* (2013.01)

(58) Field of Classification Search
CPC ........... H01M 8/02; H01M 8/12; H01M 8/06; H01M 8/24; H01M 8/2485
USPC .......................................................... 429/459
See application file for complete search history.

(56) References Cited

U.S. PATENT DOCUMENTS

| | | | | |
|---|---|---|---|---|
| 8,206,865 B2 * | 6/2012 | Hashimoto | ......... | H01M 8/0232 |
| | | | | 429/434 |
| 2010/0330450 A1 * | 12/2010 | Huang | ................ | H01M 4/8621 |
| | | | | 429/480 |

(Continued)

FOREIGN PATENT DOCUMENTS

| JP | 2002-313369 A | 10/2002 |
|---|---|---|
| JP | 2003-123827 A | 4/2003 |
| JP | 2004-127640 A | 4/2004 |

(Continued)

OTHER PUBLICATIONS

English Translation of JP2007-109598.*

(Continued)

*Primary Examiner* — Patrick Ryan
*Assistant Examiner* — Kiran Quraishi
(74) *Attorney, Agent, or Firm* — Kanesaka Berner & Partners

(57) ABSTRACT

Provided is a fuel cell capable of reducing the size thereof by reducing the installation space. The fuel cell includs a plurality of cell tubes, a lower tube plate fixing one end portion of the plurality of cell tubes, a gas flow path portion communicatively connected to an electric power generating chamber through the lower tube plate, a fuel discharge header and an air supply passage provided in the gas flow path portion, in which the fuel discharge header is communicatively connected to an interior of the cell tubes on one surface side and is adjacent to the air supply passage on the other surface and a side surface with a metal member interposed therebetween.

5 Claims, 10 Drawing Sheets

(56) References Cited

U.S. PATENT DOCUMENTS

| | | | |
|---|---|---|---|
| 2012/0183884 A1 | 7/2012 | Park et al. | |
| 2013/0095396 A1* | 4/2013 | Kong ................... | H01M 8/243 429/408 |

FOREIGN PATENT DOCUMENTS

| | | | |
|---|---|---|---|
| JP | 2007-109598 | * 4/2007 | .............. H01M 8/02 |
| JP | 2007-109598 A | 4/2007 | |
| JP | 2008-135300 A | 6/2008 | |
| JP | 2008-311140 A | 12/2008 | |
| JP | 2009-238622 A | 10/2009 | |
| JP | 2011-29074 A | 2/2011 | |
| JP | 2012-59505 A | 3/2012 | |
| JP | 2012-174543 A | 9/2012 | |
| JP | 2012-174544 A | 9/2012 | |
| JP | 2012-227065 A | 11/2012 | |

OTHER PUBLICATIONS

Office Action mailed Sep. 29, 2015, corresponding to Japanese Patent Application No. 2012-034326.

Office Action mailed Sep. 29, 2015, corresponding to Japanese Patent Application No. 2012-034328.

Notice of Allowance mailed Mar. 15, 2016, in Japanese Patent Application No. 2012-034326.

Notice of Allowance mailed Mar. 15, 2016, in Japanese Patent Application No. 2012-034328.

* cited by examiner

FUEL CELL MODULE

FIELD OF THE INVENTION

The present invention relates to a solid oxide fuel cell, and an oxidant supply method and an oxidant discharge method therefor.

DESCRIPTION OF THE RELATED ART

The fuel cell is an electric power generating device based on an electric power generating method using an electrochemical reaction and has characteristics such as excellent electric power generation efficiency and environmental friendliness. Therefore, research and development for practical use as an urban energy supply system of the 21st century is underway.

Such a fuel cell includes a fuel electrode which is an electrode on a fuel side; an air electrode which is an electrode on an air (oxidant) side; and an electrolyte which is interposed therebetween and passes only ions. Various forms have been developed depending on the types of electrolytes.

A solid oxide fuel cell (hereinafter referred to as a "SOFC") is a fuel cell using ceramics such as zirconia ceramics as the electrolyte and using natural gas, petroleum, methanol, and coal gasification gas as the fuel. The SOFC is known as a fuel cell characterized by high temperature, efficiency, and versatility, such as having an operating temperature of as high as about 900 to 1000° C. in order to increase the ionic conductivity.

In such an SOFC, for example, Japanese Laid-open Patent Publication No. 2007-109598, air is supplied from a lower portion of a side surface of a bulkhead forming the SOFC module to an inside of the bulkhead, and the air is discharged from an upper portion of the side surface of the bulkhead through inside an electric power generating chamber.

SUMMARY OF THE INVENTION

In the above described conventional SOFC, each of the bulkheads forming the fuel cell module has a substantially rectangular shape in a plane view, and a plurality of the bulkheads are arranged with each longer side thereof adjacent to each other. For this reason, the configuration of supplying air introduced from a bulkhead side surface (longer side) of the fuel cell module into an electric power generating chamber requires a large installation space in a plane view such as air pipe laying.

Specifically, in order to secure the space for the air pipe, it is necessary to increase the distance between the fuel cell modules of the SOFC, and thus the entire SOFC will increase in size by that much. Note that even a configuration of arranging the air pipe on a shorter side of the fuel cell module may increase the entire SOFC size in the direction of the longer side.

Meanwhile, it is necessary to install a fuel discharge header and a current collector portion on a lower surface side of the fuel cell module, and thus it is difficult to secure the supply passage of air to be supplied to the electric power generating chamber by a simple piping route.

From such a background, it is desired to develop an oxidant supply structure capable of reducing the size of the SOFC by reducing the installation space of the fuel cell modules for the conventional SOFC. In addition, in order to prevent damage of the air electrode, it is desired to uniformly supply an oxidant to an inside of the electric power generating chamber.

As described above, in the conventionally structured SOFC, each of the bulkheads forming the fuel cell module has a substantially rectangular shape in a plane view, and a plurality of the bulkheads are arranged with each longer side thereof adjacent to each other. For this reason, the air used to generate electric power in the fuel cell is discharged to outside not from the longer side of the bulkhead but from the shorter side of the upper portion of the side surface of the bulkhead. Note that it is difficult to install pipes and the like in the upper portion of the bulkhead because of limited space thereof.

Specifically, the conventional fuel cell adopts a configuration in which an air discharge header (oxidant header) having a substantially rectangular parallelepiped shape and partitioned above and below with a heat insulating material is formed above the electric power generating chamber, a discharge port is opened on both side surfaces on the shorter side of the air discharge header, and the air discharge pipe is connected thereto. The air discharge header is made of a member with a U-shaped cross section, and thus the entire inner surface is in an open state.

As described above, in the conventional air discharge structure, air is discharged from the shorter side of an upper portion of the fuel cell. Unfortunately, in this conventional structure, the main stream of the air supplied to an inside of the electric power generating chamber tends to take the shortest distance toward the discharge port, and thus the air is biased toward both shorter sides and unlikely to flow near the center upper portion inside the electric power generating chamber.

This results in a temperature distribution having a low temperature in a center portion of the horizontal cross section inside the electric power generating chamber, and further a low oxygen concentration in the center portion of the horizontal cross section. This leads to a concern that when the temperature and oxygen concentration distributions occur inside the electric power generating chamber, the fuel cell cannot sufficiently exhibit the electric power generation performance and also may be damaged by the low concentration of oxygen.

From such a background, what is required of the fuel cell is to prevent or suppress a temperature distribution and an oxygen concentration distribution from occurring inside the electric power generating chamber. Thus, it is necessary to improve a discharge passage structure and a discharge method for causing the air (oxidant) that discharged outside by way of the air discharge header from the electric power generating chamber.

The present invention has been made to solve the above problems and an object thereof is to provide a fuel cell capable of reducing the size by reducing the installation space as well as an oxidant supply method therefor.

Further, another object of the present invention is to provide a fuel cell capable of preventing or suppressing a temperature distribution and an oxygen concentration distribution from occurring inside an electric power generating chamber as well as an oxidant discharge method therefor.

In order to solve the above problems, the present invention adopts the following solutions.

A fuel cell according to a first aspect of the present invention comprises a plurality of fuel cell tubes; a partition member fixing one end portion of a plurality of the fuel cell tubes; a gas flow path portion communicatively connected to an electric power generating chamber through the partition member; and a first space and a second space provided in the gas flow path portion, wherein the first space is communicatively connected to an inside of the fuel cell tube on one surface side and provided adjacent to the second space with a metal member interposed therebetween on the other surface and a side surface.

According to such a fuel cell, the first space provided in the gas flow path portion is communicatively connected to an inside of the fuel cell tube on one surface side and provided adjacent to the second space with a metal member interposed therebetween on the other surface and a side surface. This structure can eliminate the oxidant supply pipe and the fuel gas discharge pipe from the side surface of the fuel cell. Therefore, the installation space can be reduced by narrowing the space between adjacent fuel cells.

In the first aspect, the configuration may be such that the second space is communicatively connected to the electric power generating chamber through a plurality of flow holes and each of the flow holes includes a slit provided on at least one side of a side wall flange portion of the second space. This makes it possible to more uniformly supply an oxidant to an inside of the electric power generating chamber.

Alternatively, the above configuration may such that the slit is provided on a longer side and a shorter side of the side wall flange portion. This makes it possible to more uniformly supply an oxidant gas to the inside of the electric power generating chamber.

An oxidant supply method of a fuel cell according to a second aspect of the present invention is an oxidant supply method of a fuel cell for introducing a fuel gas from a fuel supply chamber to an inside of a fuel cell tube to be discharged to a fuel discharge chamber; introducing an oxidant from an oxidant supply chamber into an electric power generating chamber to flow the oxidant upward from below through an outside of the fuel cell tube toward an oxidant discharge chamber, and then causing the fuel gas and the oxidant to be electrochemically reacted to generate electric power, the method for partitioning an interior of a container in a vertical direction to form the fuel supply chamber, the oxidant discharge chamber, the electric power generating chamber, the oxidant supply chamber, and the fuel discharge chamber in order, from top to bottom; opening a plurality of the fuel cell tubes penetrating the electric power generating chamber in a vertical direction inside the container such that an upper end of each of the fuel cell tubes is opened in the fuel supply chamber and a lower end of each of the fuel cell tubes is opened in the fuel discharge chamber; forming a double-walled structure by placing and installing the fuel discharge chamber in a recessed portion of a support frame serving as a lower surface of the container to form a space between wall surfaces; sealing the space and an upper surface of the fuel discharge chamber by installing a partition member in an inner edge portion of the support frame; providing an oxidant flow path communicatively connecting between the space and the oxidant supply chamber; supplying the oxidant from a lower portion of the container to the oxidant supply chamber through the space; and discharging the fuel gas of the fuel discharge chamber from the lower portion of the container through a pipe passage penetrating the support frame.

The oxidant supply method of the fuel cell according to the second aspect is for forming a double-walled structure by placing and installing the fuel discharge chamber in a recessed portion of a support frame serving as a lower surface of the container to form a space between wall surfaces; sealing the space and an upper surface of the fuel discharge chamber by installing a partition member in an inner edge portion of the support frame; providing an oxidant flow path communicatively connecting between the space and the oxidant supply chamber; supplying the oxidant from a lower portion of the container to the oxidant supply chamber through the space; and discharging the fuel gas of the fuel discharge chamber from the lower portion of the container through a pipe passage penetrating the support frame. This can eliminate the oxidant supply pipe and the fuel gas discharge pipe from the container side surface. Therefore, the installation space can be reduced by narrowing the gap between adjacent fuel cells.

The fuel cell according to a third aspect of the present invention comprises an electric power generating chamber; an oxidant header provided adjacent to the electric power generating chamber with a heat insulating material interposed therebetween; and a duct provided on an outer periphery of the oxidant header, wherein the duct includes at least one oxidant introduction hole on an inner wall of a first opposing side surface.

In the fuel cell according to the third aspect, the duct includes at least one oxidant introduction hole on an inner wall of a first opposing side surface, and thus the oxidant flowing into the oxidant header from the electric power generating chamber and used to generate electric power passes through the at least one oxidant introduction hole on the inner wall of the first opposing side surface and discharged outside. Such an oxidant discharge passage gives pressure loss to the oxidant passing through the introduction hole having a small cross section, thereby uniformizing the flow of the oxidant flowing from the electric power generating chamber to the oxidant discharge chamber. Therefore, the flow of the oxidant passing through an inside of the electric power generating chamber is rectified.

In the third aspect, the duct may comprise an air discharge pipe on an outer wall of a second opposing side surface.

Alternatively, in the third aspect, the outer periphery of the duct may have a picture frame like rectangular shape, the first opposing side surface may be a longer side of the duct, and the second opposing side surface may be a shorter side of the duct.

In the third aspect, a porosity of the introduction hole may be set to a value for rectifying by giving pressure loss in the electric power generating chamber. Specifically, a plurality of through-holes such as a circle and a rectangle may be provided or a plurality of long slits may be provided in a longitudinal direction to have a porosity of about 4%. Note that even a reduction of the porosity to less than about 4% will simply increase pressure loss and will hardly improve rectification.

The oxidant discharge method of a fuel cell according to a fourth aspect of the present invention is an oxidant discharge method of a fuel cell for introducing a fuel gas from a fuel supply chamber to an inside of a fuel cell tube to be discharged to a fuel discharge chamber; introducing an oxidant from an oxidant supply chamber into an electric power generating chamber to flow the oxidant upward from below through an outside of the fuel cell tube toward an oxidant discharge chamber, and then causing the fuel gas and the oxidant to be electrochemically reacted to generate electric power, the method including: providing, by partitioning an interior of a container in a vertical direction, the fuel supply chamber, the oxidant discharge chamber, the electric power generating chamber, the oxidant supply chamber, and the fuel discharge chamber in order, from top to bottom; opening a plurality of the fuel cell tubes penetrating the electric power generating chamber in a vertical direction inside the container such that an upper end of each of the fuel cell tubes is opened in the fuel supply chamber and a lower end of each of the fuel cell tubes is opened in the fuel discharge chamber; forming a discharge passage having a box-shaped cross section communicatively connected to each other along four wall surfaces of the oxidant discharge chamber having a substantially rectangular horizontal cross-sectional shape; and passing the oxidant from an introduction hole provided to penetrate a longer side inner wall surface of the discharge passage to be discharged from a discharge pipe connected to a shorter side outer wall surface.

The oxidant discharge method of the fuel cell according to the fourth aspect is for forming a discharge passage having a box-shaped cross section communicatively connected to each other along four wall surfaces of the oxidant discharge chamber having a substantially rectangular horizontal cross-sectional shape; and passing the oxidant from an introduction hole provided to penetrate a longer side inner wall surface of the discharge passage to be discharged from a discharge pipe connected to a shorter side outer wall surface. Thus, the oxidant that is used to generate electric power and then flows from the electric power generating chamber into the oxidant discharge chamber flows from an introduction hole drilled in a longer side inner wall surface into a discharge passage and passes through a discharge pipe connected to a shorter side outer wall surface to be discharged outside. Such an oxidant discharge method is for giving pressure loss to the oxidant passing through an introduction hole having a small cross section, and thus uniformizing the flow of the oxidant flowing from the electric power generating chamber to the oxidant discharge chamber and rectifying the flow of the oxidant within the electric power generating chamber.

The present invention can reduce the size of an SOFC (solid oxide fuel cell) by reducing the installation space of the fuel cell.

Further, the oxidant can be uniformly supplied into the electric power generating chamber, thereby to be able to prevent or suppress the air electrode from being damaged, and improve the reliability and the durability by uniformizing the flow rate deviation and the temperature inside the electric power generating chamber.

Further, the present invention can prevent or suppress a temperature distribution and an oxygen concentration distribution from occurring in the electric power generating chamber so as to evenly distribute the oxidant inside the electric power generating chamber by uniformizing the flow of an oxidant flowing from within the electric power generating chamber to the oxidant discharge chamber rectify and pass the oxidant. As a result, the fuel cell can sufficiently exhibit the performance to efficiently generate electric power, and further can prevent damage due to a low oxygen concentration to improve the reliability and the durability.

DESCRIPTION OF EMBODIMENTS

Hereinafter, an embodiment of the fuel cell and the oxidant supply method according to the present invention will be described based on the drawings.

Figure 1:
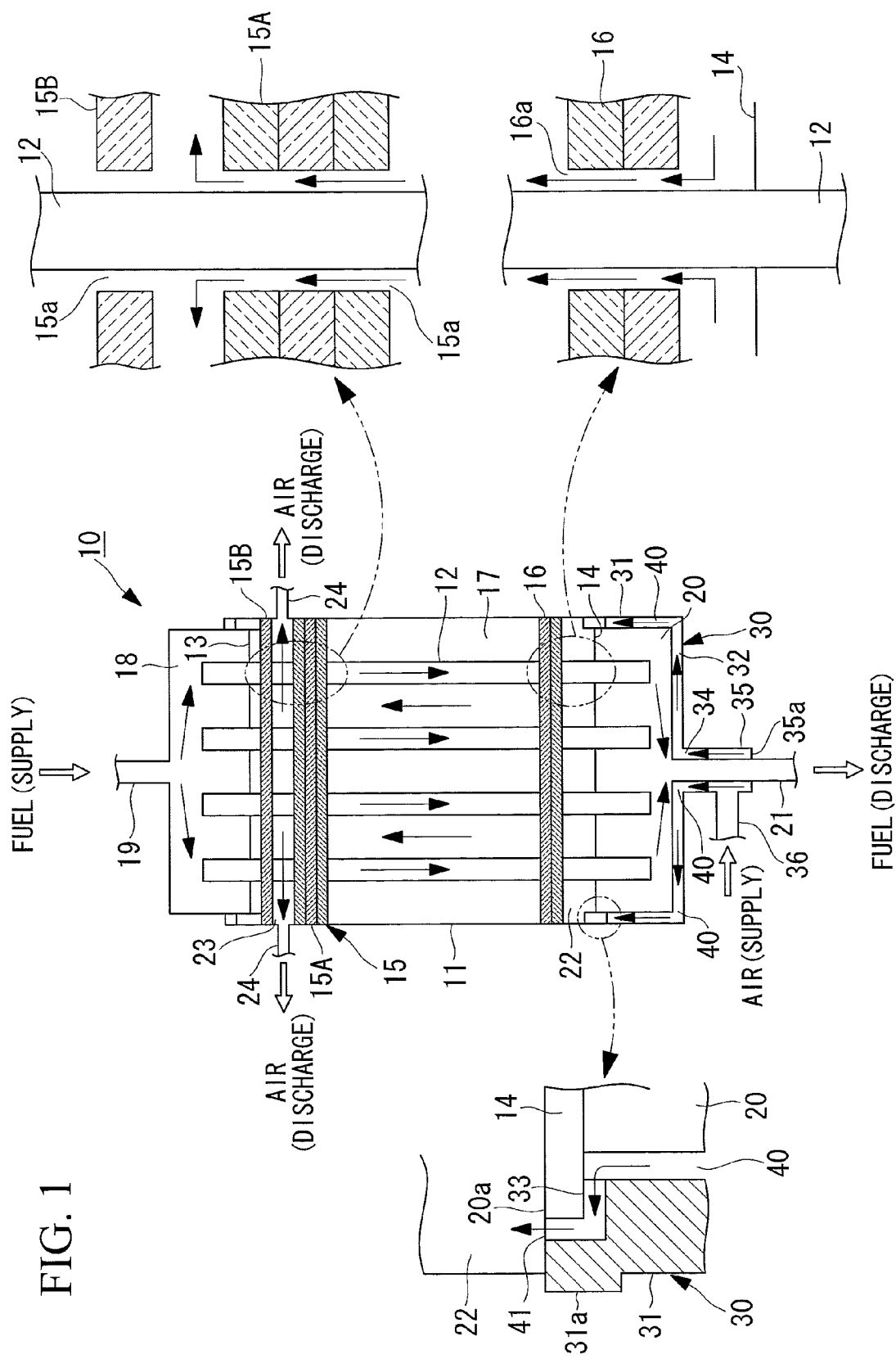
FIG. 1 is a longitudinal sectional view schematically illustrating an embodiment of a fuel cell according to the present invention.
Figure 2:
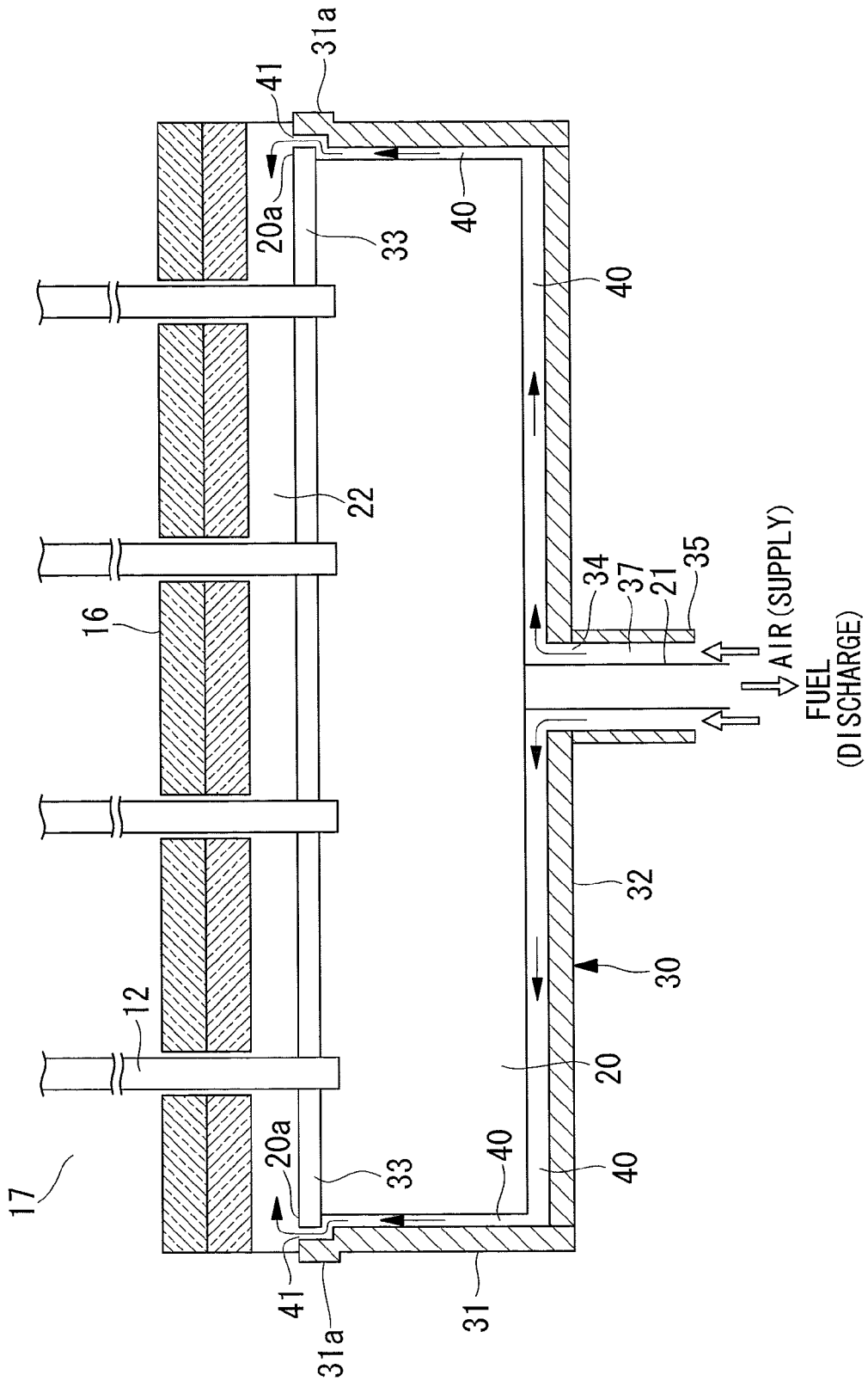
FIG. 2 is an enlarged view of a lower structure of the fuel cell illustrated in FIG. 1, and a sectional view of a portion including a space serving as an oxidant supply passage.
Figure 3:
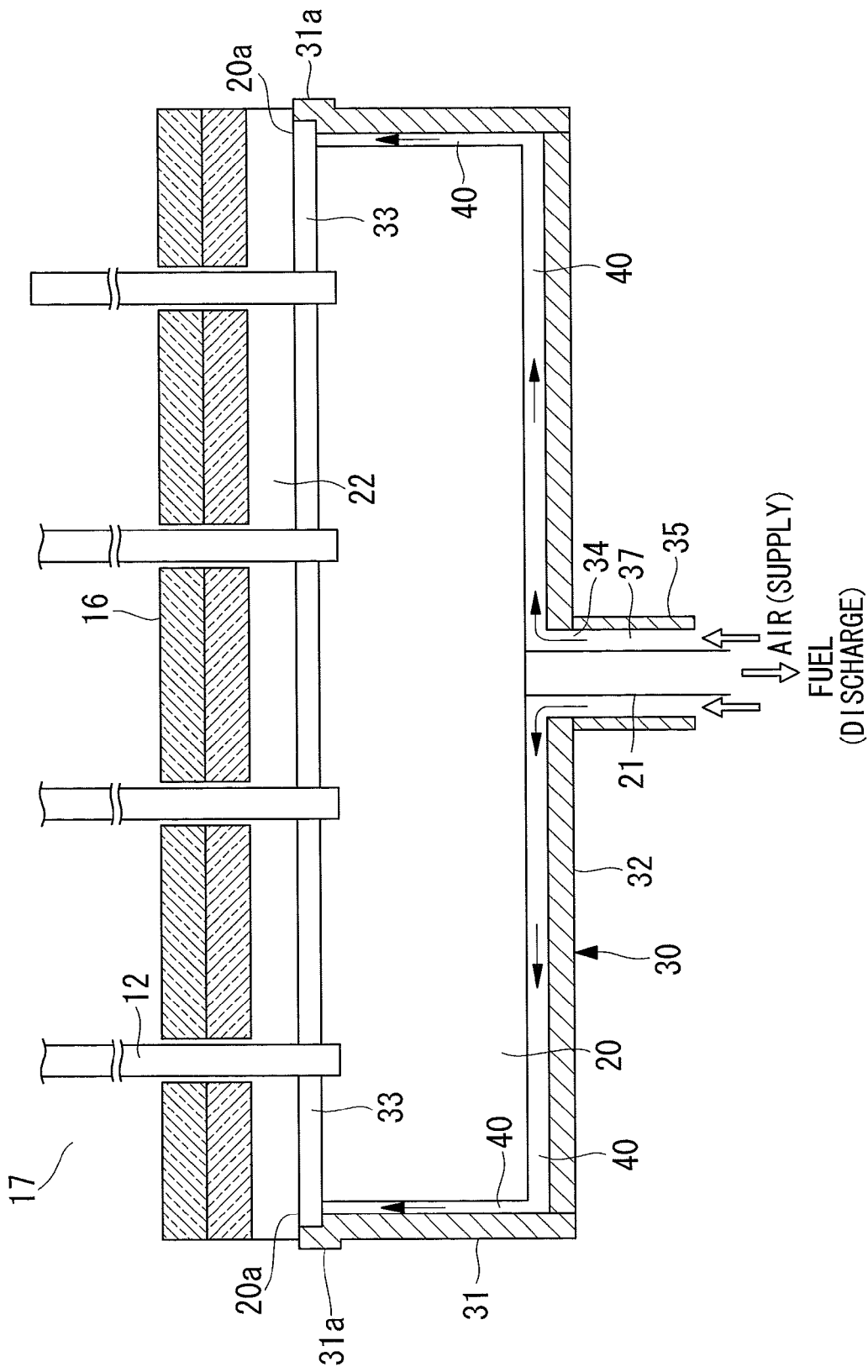
FIG. 3 is an enlarged view of the lower structure of the fuel cell illustrated in FIG. 1, and a sectional view of a portion without a space serving as an oxidant supply passage.

FIG. 1 illustrates a fuel cell (fuel cell module) 10 that is applied to a solid oxide fuel cell (hereinafter referred to as an "SOFC") system. A typical SOFC system includes an SOFC-type fuel cell 10 that generates electric power; a reformer for reforming a fuel gas such as a manufactured gas and a natural gas; an air preheater that preheats an oxidant gas (the oxidant refers to a gas containing about 15% to 21% of oxygen. Typically air is suitable, but the oxidant is not limited to air. For example, a mixed gas of a combustion exhaust gas and air, a mixed gas of oxygen and air and other mixed gases can be used); and a combustor that burns an unburned fuel gas contained in an exhaust gas discharged from the fuel cell 10. The following description assumes that air is used as the oxidant gas.

Hereinafter, for convenience of description, the terms "upper (above)" and "lower (under)" are used with reference to the paper to identify the positional relationship of each component, but this is not necessarily applied to the vertical direction. For example, the direction may be a direction reversed vertically, a horizontal direction perpendicular to the vertical direction, and a direction inclined from the horizontal direction.

Further, the SOFC system includes a temperature raising fuel supply portion that supplies a fuel gas for raising temperature such as methane to air supplied to the fuel cell 10 at the time of start-up; and a preheater that preheats the air to a predetermined temperature at the time of start-up.

The preheater receives a supply of electric power to generate heat and heats a combustion catalyst to a predetermined temperature sufficient to react the air and the fuel for raising temperature.

The reformer is configured such that a high temperature air discharged from an air discharge header (air discharge chamber) 23 described later passes through inside the reformer so as to heat a fuel gas supplied from outside.

The combustor is connected to a fuel discharge header (fuel discharge chamber) 20 described later, and an air discharge header 23 through an air preheater.

For example, as illustrated in FIG. 1, the fuel cell 10 schematically includes a bulkhead (container) 11 made of a heat insulating material; a plurality of cell tubes (fuel cell tubes) 12 formed in a substantially cylindrical shape; upper and lower tube plates 13 and 14 supporting both ends of the cell tube 12; upper and lower heat insulators 15 and 16 arranged between the upper and lower tube plates 13 and 14; and a support frame (gas flow path portion) 30 having a double container structure that is provided in a lower portion of the bulkhead 11 and stores a fuel discharge header (first space) 20 to form an air flow path (an air supply passage 40 and an air flow hole 41 described later).

The upper heat insulator 15 is divided into a first upper heat insulator 15A and a second upper heat insulator 15B to form an air discharge header 23 described later. The air discharge header 23 is formed between the first upper heat insulator 15A and the second upper heat insulator 15B.

An electric power generating chamber 17 is defined by the bulkhead 11, the upper heat insulators 15, and lower heat insulators 16, more specifically between the first heat insulator 15A and the lower heat insulator 16. A fuel supply header (fuel supply chamber) 18 is defined by the bulkhead 11, and the upper tube plate 13, and a fuel supply tube 19 is connected to an upper surface thereof. A space of a fuel discharge header 20 is formed on a lower side of the lower tube plate 14.

An air supply header 22 is formed between the lower tube plate 14 and the lower heat insulator 16. An air discharge header 23 is formed between the upper tube plate 13 and the upper heat insulator 15. An air discharge pipe 24 is connected to the air discharge header 23.

The upper tube plate 13 is a plate-like member arranged on an upper side (above in FIG. 1) in a longitudinal direction of the prismatic bulkhead 11 having a substantially rectangular horizontal cross-sectional shape and serves as a lower surface member of the fuel supply header 18.

Similarly, the lower tube plate 14 is a plate-like member arranged on a lower side (under in FIG. 1) in the longitudinal direction thereof and serves as an upper surface member of the fuel discharge header 20 as well as a lower surface member of the air supply header 22. Further, the lower tube plate 14 is a member that seals an upper end portion of an air supply passage 40 described later and an outer peripheral portion thereof serves as a flange portion 20a.

One end portion of the cell tube is airtightly fixed to and supported by the lower tube plate 14. The fuel gas flows from the fuel supply header 18 to the fuel discharge header 20 by passing through an inner surface of the cell tube and through the electric power generating chamber.

Note that the longitudinal direction in this case may be a vertical direction of the bulkhead 11 having a substantially prismatic shape.

The cell tube 12 is a substantially cylindrical tube made of porous ceramics and a fuel cell (unillustrated) that generates electric power is provided in a central portion in the longitudinal direction thereof. In the present embodiment, a substantially cylindrical tube is used as the cell tube 12, but the cell tube is allowed to use any cylindrical tube having a hollow inner portion, and a circular, elliptical, or square tube is used as the electric power generation cell.

The cell tube 12 is supported by through-holes drilled through the upper and lower tube plates 13 and 14 such that one opening end thereof is opened in the fuel supply header 18 and the other opening end thereof is opened in the fuel discharge header 20. Further, the cell tubes 12 are arranged such that the fuel cells are positioned only in the electric power generating chamber 17.

The upper heat insulator 15 is a member that is arranged on an upper side (above in FIG. 1) in a longitudinal direction of the bulkhead 11 and is made of a heat insulating material to be formed in a blanket shape, a board shape, or other shape. The lower heat insulating material 16 is a member that is arranged on a lower side (under in FIG. 1) in the longitudinal direction of the bulkhead 11 and is made of a heat insulating material to be formed in a blanket shape, a board shape, or other shape so as to serve as the upper surface member of the air supply header 22.

The upper heat insulator 15 and the lower heat insulator 16 include holes 15a and 16a through which the cell tube 12 is inserted. The holes 15a and 16a have a diameter larger than that of the cell tube 12 so as to enable air to pass therethrough.

The inner peripheral surface of the holes 15a and 16a is not particularly limited, but is allowed to form in a substantially cylindrical shape. Alternatively, the inner peripheral surface of the holes 15a and 16a is also allowed to form a recess (groove) or a projection (ridge-like projection) having a spiral or linear form.

Such a configuration causes heat of the lower heat insulator 16 to be easily transmitted to the air passing through between the cell tube 12 and the holes 15a and 16a, and flowing into the electric power generating chamber 17. Thus, it is easy to maintain a high temperature of the electric power generating chamber 17.

The lower end portion (lower structure) of the bulkhead 11 has a double-walled structure made of a metal member that stores the fuel discharge header 20 in the support frame 30 to form an air flow path.

The fuel discharge header 20 is a member having a hollow box shape (substantially rectangular parallelepiped shape) with the upper surface thereof including the lower tube plate 14, and is placed and installed in an interior space (having a substantially rectangular parallelepiped shape) of the support frame 30 having substantially the same shape with the upper surface being opened.

Specifically, the fuel discharge header 20 is a hollow member having substantially the same shape as and slightly smaller than the support frame 30, and is fixedly attached to an appropriate position such as an upper end portion such that the lower tube plate 14 covers the upper surface opening thereof.

In this case, the planar shape of the lower tube plate 14 is made larger than that of the fuel discharge header 20 so that the outer peripheral portion thereof is projected horizontally outward around the entire circumference. This projected portion forms the flange portion 20a of the fuel discharge header 20. Note that a fuel discharge pipe 21 is connected to a bottom surface of the fuel discharge header 20.

The air supply header 22, the air supply passage (second space) 40, and the fuel discharge header 20 arranged in a lower portion of the electric power generating chamber 17 in FIG. 1 will be described further in detail with reference to FIGS. 2 to 5.

The support frame 30 is a box-shaped member with the upper surface being opened, and includes a side surface 31 and a bottom surface 32. A side wall flange portion 31a is formed on an upper end portion of the side surface 31. A stepped portion 33 lower than the outer periphery is provided around the entire circumference of the side wall flange portion 31a. The stepped portion 33 is a portion for installing and locking a flange portion 20a provided in an upper end outer peripheral portion of the fuel discharge header 20 when the fuel discharge header 20 is stored in the support frame 30.

An air supply port 34 is provided in a bottom surface 32 of the support frame 30, and an air supply nozzle 35 oriented downward is connected thereto. An air supply pipe 36 is connected to a side surface of the air supply nozzle 35. Further, the fuel discharge pipe 21 of the fuel discharge header 20 described above runs through inside the air supply port 34 and the air supply nozzle 35 and then runs downward through a bottom portion 35*a* of the air supply nozzle 35 to be connected to an unillustrated external device.

The air supply port 34 and the air supply nozzle 35 have a diameter larger than that of the fuel discharge pipe 21. Thus, an air introducing space portion 37 having a ring-like cross-sectional shape and guiding air supplied from the air supply pipe 36 to the air supply header 22 is formed between an outer peripheral surface of the fuel discharge pipe 21 and an inner peripheral surface of the air supply nozzle 35. The air introducing space portion 37 is communicatively connected to a space of the air supply passage 40 formed between an inner peripheral surface of the support frame 30 and an outer peripheral surface of the fuel discharge header 20 through the air supply port 34. Therefore, the air supplied from the air supply pipe 36 flows from the air introducing space portion 37 into the air supply passage 40 formed on an outer periphery (bottom surface and side surface) of the fuel discharge header 20.

Figure 4:
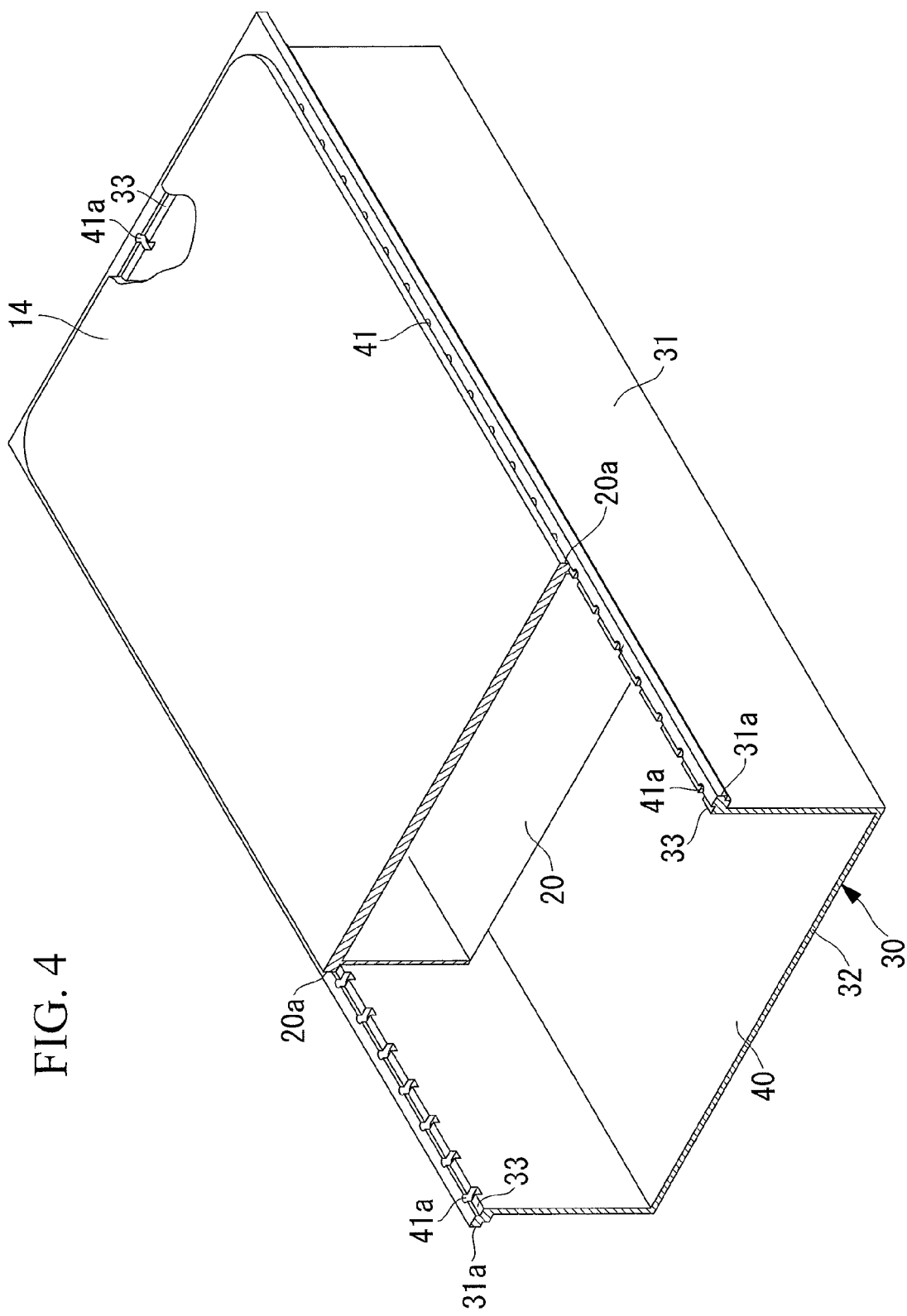
FIG. 4 is an enlarged sectional perspective view illustrating the main components of the lower structure of the fuel cell illustrated in FIG. 1.
Figure 5:
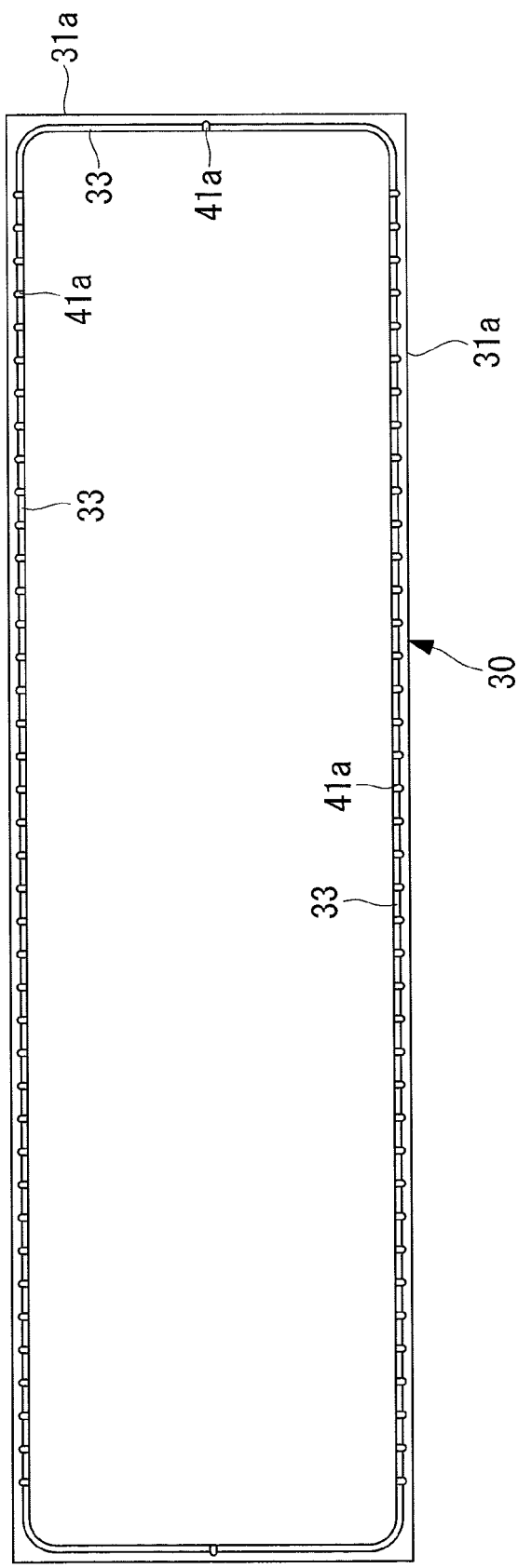
FIG. 5 is a plan view illustrating a support frame (gas flow path portion) used in the lower structure of the fuel cell illustrated in FIG. 1.

Note that in a side wall flange portion 31*a* provided on an upper end portion of the side wall 31 of the support frame 30, the above described flange portion 20*a* is installed on an upper surface of the stepped portion 33. Thus, in order to supply air from the air supply passage 40 to the air supply header 22, that is, to supply air to the air supply header 22, the air supply passage 40 includes a plurality of air flow holes (oxidant flow path) 41 provided in the stepped portion 33 of the side wall flange portion 31*a*. For example, as illustrated in FIG. 4, the air flow holes 41 are provided in the support frame 30 having a substantially rectangular shape in a plane view such that they are arranged so as to open around the air supply chamber 22. The air supply passage 40 is communicatively connected to the electric power generating chamber 17 through the air flow holes 41 so that an oxidant is supplied to the electric power generating chamber 17 through the air supply header 22.

Specifically, a plurality of air flow holes 41 are provided at a predetermined pitch on an opposing pair of longer sides and provided, one for each, on an opposing pair of shorter sides, but the configuration is not limited to this. Note that in order to uniformly supply air to the electric power generating chamber 17, the air flow holes 41 may be provided in the air supply chamber 22 so as to open around the air supply chamber 22, and in order to more uniformly supply air thereto, it is desirable to provide the air flow hole 41 not only on the longer side but also on the shorter side.

The illustrated air flow hole 41 includes a slit 41*a* having a recessed groove shape provided on the stepped portion 33 and a wall surface of the flange portion 20*a*. The air flow hole 41 may have a slit 41*a* extending to an outer periphery of the stepped portion 33, or may be combined with a notch of the flange portion 20*a*.

Note that without being limited to the above described slit 41*a*, for example, the air flow hole 41 may be configured such that holes are provided so as to penetrate through the side wall 31 and the flange portion 20*a* to communicatively connect between the air flow path 40 and the air supply header 22.

As described above, the fuel cell 10 according to the present embodiment introduces a fuel gas from the fuel supply header 18 to an inside of the cell tube 12 to be discharged to the fuel discharge header 20; introduces air from the air supply header 22 into the electric power generating chamber 17 to flow it upward from below through an outside of the cell tube 12 toward the air discharge header 23, and then causes the fuel gas and the oxidant air to be electrochemically reacted to generate electric power. The fuel cell 10 partitions the interior of the bulkhead 11 in a vertical direction thereof to form the fuel supply header 18, the air discharge header 23, the electric power generating chamber 17, the air supply header 22, and the fuel discharge header 20 in order, from top to bottom.

A plurality of cell tubes 12 are provided so as to penetrate in the vertical direction through the electric power generating chamber 17 in the bulkhead 11 such that an upper end of each cell tube 12 opens in the fuel supply header 18 and a lower end thereof opens in the fuel discharge header 20.

The lower end portion of the bulkhead 11 is configured as a double box structure in which the fuel discharge header 20 is placed and installed in a recessed portion of the support frame 30 serving as a lower surface of the bulkhead 11, and in which a space serving as the air supply passage 40 is formed between the wall surfaces of the bulkhead 11 and the fuel discharge header 20. The space, that is, the upper end portion of the air supply passage 40 and the upper surface of the fuel discharge header 20, is sealed by a lower tube plate 14 serving as the partition member installed in the stepped portion 33 which is an inner edge portion of the support frame 30. In this case, the outer peripheral portion of the lower tube plate 14 serving as the flange portion 20*a* seals the upper end portion of the air supply passage 40.

The air supply passage 40 and the air supply chamber 22 are communicatively connected to each other through a plurality of air flow holes 41 provided in appropriate places therebetween. Thus, the oxidant air is supplied from a lower portion of the bulkhead 11, that is, from the bottom surface 32 of the support frame 30, to the air supply chamber 22 through the air supply passage 40 and the air flow hole 41.

The air is supplied to the electric power generating chamber 17 through between the holes 16*a* formed in the lower heat insulator 16 and the cell tubes 12. Then, the air used for electrochemical reaction in the electric power generating chamber 17 flows through between the holes 15*a* formed in the upper heat insulator 15 and the cell tubes 12 to be guided from the electric power generating chamber 17 to the air discharge header 23, and then discharged to outside the bulkhead 11 through the air discharge pipe 24.

Meanwhile, the fuel gas introduced from the fuel supply tube 19 to the fuel supply header 18 flows into the fuel discharge header 20 through the cell tubes 12. When the fuel gas passes through the electric power generating chamber 17, the fuel gas electrochemically reacts with air to generate electric power.

The fuel gas flowing into the fuel discharge chamber 20 passes through a fuel discharge pipe 21 which is a pipe passage penetrating through the bottom surface 32 of the support frame 30, and discharged from the lower portion of the bulkhead 11, that is, from the bottom surface 32 of the support frame 30 to outside the bulkhead 11.

As described above, the lower end portion of the bulkhead 11 is configured as a double box structure in which the fuel discharge chamber 20 is placed and installed in a recessed portion of the support frame 30 serving as the lower surface of the bulkhead 11 to form the air supply passage 40 between the wall surfaces, and the air is supplied from the lower bottom side of the bulkhead 11 to the air supply header 22 through the air supply passage 40 and the air flow holes 41, and the fuel gas in the fuel discharge header 20 is discharged from the lower bottom side of the bulkhead 11 through the fuel discharge pipe 21 penetrating through the bottom surface 32 of the support frame 30, thus eliminating the need of installation space in the side surface of the bulkhead 11 for installing conduits required to apply the air and conduits required to discharge the fuel gas.

Specifically, the bottom side of the fuel cell 10 requires the installation space for the fuel discharge header 20 and unillustrated current collectors, but the adoption of the above described double box structure enables the installation of the air supply passage 40 and the air flow holes 41 serving as the air flow path for supplying air to the electric power generating chamber 17 without affecting the installation of the fuel discharge header 20 and the current collectors.

As a result, a plurality of fuel cells 10 with longer sides having a rectangular shape in a plane view provided adjacent to each other can reduce the installation space by narrowing the mutual interval, resulting in reduction in size of the entire SOFC.

The above described air flow holes 41 may be provided around inside the air supply header 22. Specifically, a plurality of air flow holes 41 may be provided below an inner wall surface forming the space for the air supply header 22, that is, a plurality of air flow holes 41 may be provided to open in an outer peripheral portion of the lower tube plate 14 forming the lower surface of the air supply header 22, so as to substantially uniformly supply air from the air supply header 22 to the electric power generating chamber 17.

More specifically, a large number of air flow holes 41 may be provided at an equal pitch on both longer sides of the air supply header 22 having a substantially rectangular shape in a plane view, but the air flow holes 41 may be provided not only on the longer sides but also on the shorter sides. In this case, the air flow holes 41 may be provided near the center portion, one for each, on both shorter sides, thereby to be able to more uniformly supply air into the electric power generating chamber 17.

Figure 6:
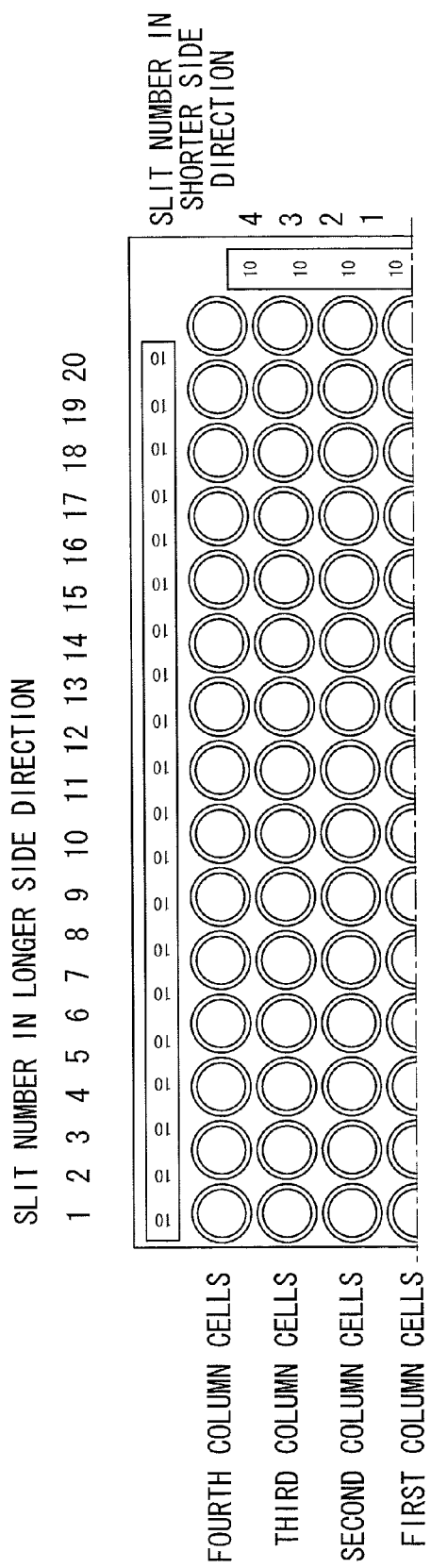
FIG. 6 describes the conditions for simulation calculation of the flow rate deviation of an air flow rate (for each cell tube) of the air flowing inside the electric power generating chamber.
Figure 7:
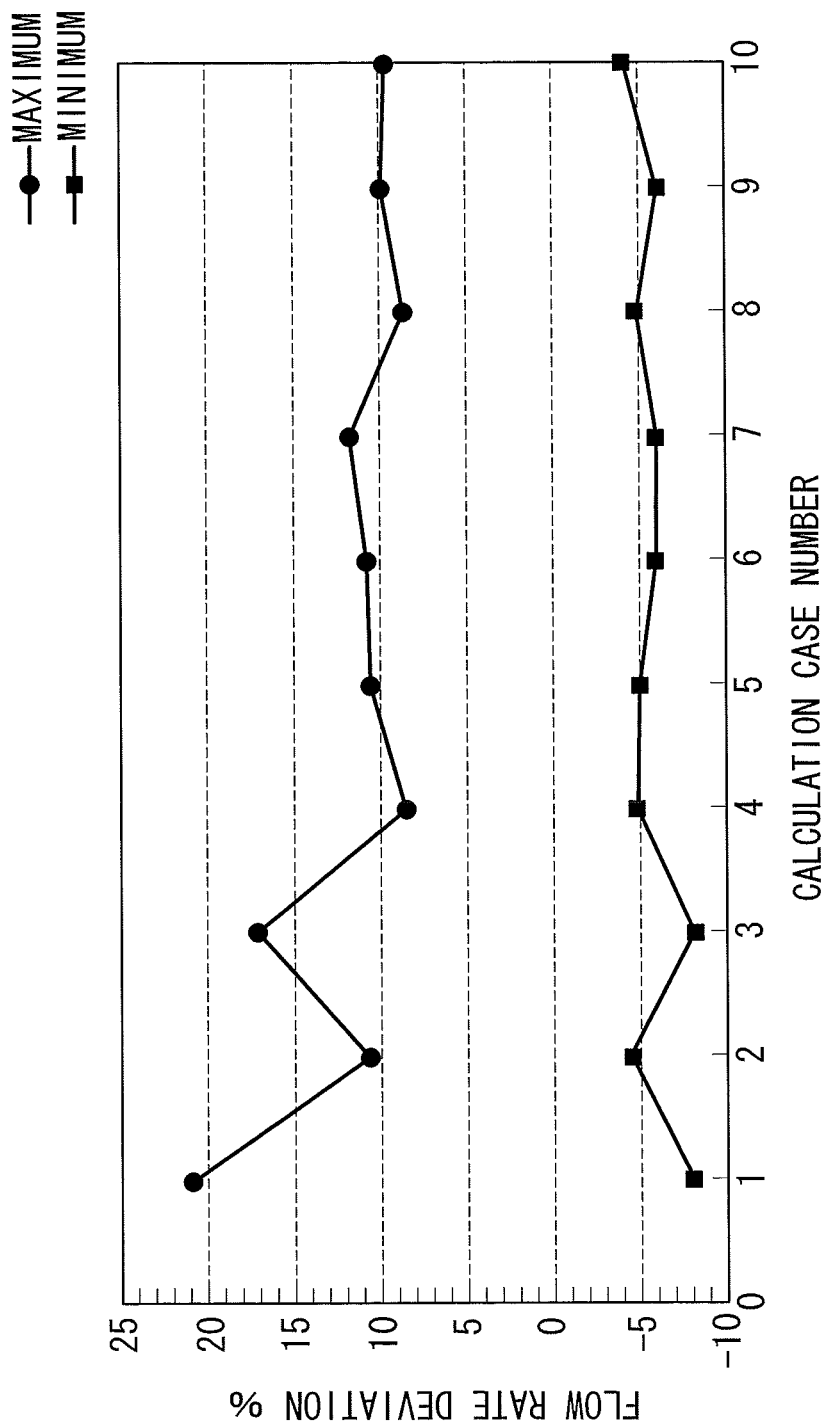
FIG. 7 shows a graph with the horizontal axis representing the calculation case numbers and the vertical axis representing the maximum and minimum flow rate deviations (%), the graph illustrating the results of the simulation calculation of the flow rate deviation of the air flow rate (for each cell tube) of the air flowing inside the electric power generating chamber.
Figure 8:
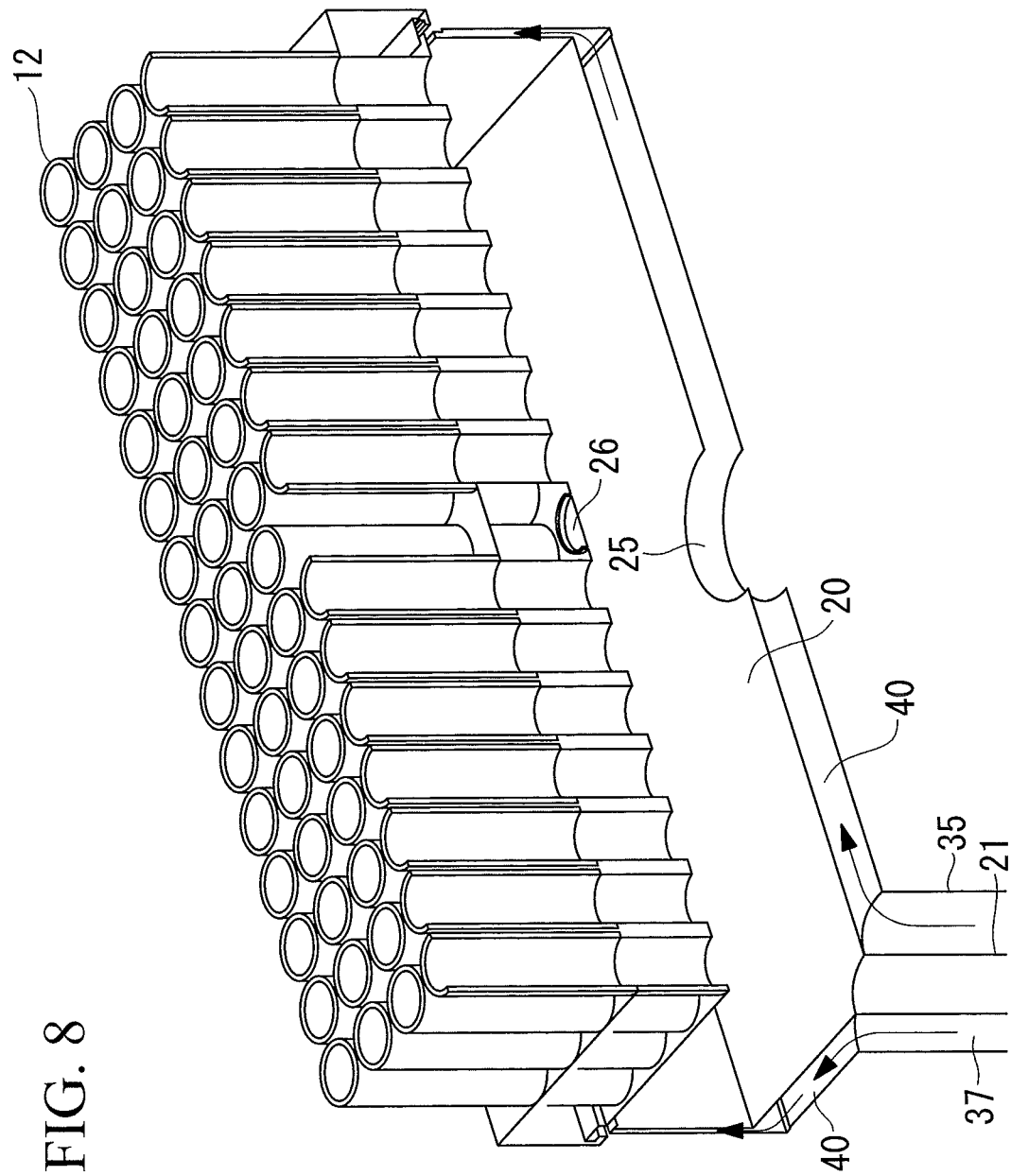
FIG. 8 is a perspective view illustrating a ¼ simulation model (lower structure) of a fuel cell for use in simulation calculation of the flow rate deviation of the air flow rate (for each cell tube) of the air flowing inside the electric power generating chamber.

Hereinafter, the relation between the (number of) placement of the air flow holes 41 and the flow rate deviation will be described with reference to FIGS. 6 to 8 and Table 1. The flow rate deviation in this case is such that a simulation model (¼ model of the fuel cell 10) having the lower structure as illustrated in FIG. 8 is used to calculate the mass flow rate of the air for each cell tube 12 in the electric power generating chamber 17 regarding the cases 1 to 10 by changing the opening position of the slits 41a serving as the air flow holes 41 on the longer sides and the shorter sides to obtain the maximum and minimum flow rate deviations. Table 1 shows the conditions for the calculation cases 1 to 10 for simulation calculation of the flow rate deviation of an air flow rate (for each cell tube) of the air flowing inside the electric power generating chamber.

TABLE 1

| | | | CASE OF SUPPLYING AIR FROM ENTIRE CIRCUMFERENCE | CASE OF SUPPLYING AIR FROM LONGER SIDE | CASE OF CLOSING 7 SLITS FROM ENTIRE CIRCUMFERENCE SUPPLY |
|---|---|---|---|---|---|
| SLIT NUMBER SUPPLIED BY ¼ MODEL | LONGER SIDE | — | All | All | 1-10, 12, 14, 16, 18, 20 |
| | SHORTER SIDE | — | All | — | 1.3 |
| FLOW RATE DEVIATION OF CELL | MAXIMUM | % | 120.8 | 110.6 | 117.0 |
| | MINIMUM | % | 91.8 | 95.5 | 91.7 |
| | | | CASE OF CLOSING 3 SLITS FROM ENTIRE CIRCUMFERENCE SUPPLY | CASE OF CLOSING 4 SLITS FROM ENTIRE CIRCUMFERENCE SUPPLY | CASE OF SUPPLYING FROM ALL SLITS ON LONGER SIDE AND 2 SLITS ON SHORTER SIDE |
| SLIT NUMBER SUPPLIED BY ¼ MODEL | LONGER SIDE | — | 1-18, 20 | 1-16, 18, 20 | All |
| | SHORTER SIDE | — | 1.3 | 1.3 | 1.3 |
| FLOW RATE DEVIATION OF CELL | MAXIMUM | % | 108.4 | 110.3 | 110.5 |
| | MINIMUM | % | 95.2 | 95.0 | 94.0 |
| | | | CASE OF SUPPLYING FROM ALL SLITS ON LONGER SIDE AND 2 SLITS ON SHORTER SIDE | CASE OF SUPPLYING FROM ALL SLITS ON LONGER SIDE AND 1 SLIT ON SHORTER SIDE | CASE OF SUPPLYING FROM ALL SLITS ON LONGER SIDE AND 2 SLITS ON SHORTER SIDE |
| SLIT NUMBER SUPPLIED BY ¼ MODEL | LONGER SIDE | — | All | All | All |
| | SHORTER SIDE | — | 2.4 | 1 | 1.2 |
| FLOW RATE DEVIATION OF CELL | MAXIMUM | % | 111.5 | 108.4 | 109.8 |
| | MINIMUM | % | 94.0 | 95.2 | 93.8 |

TABLE 1-continued

|  |  |  | CASE OF SUPPLYING FROM ALL SLITS ON LONGER SIDE AND 0.5 SLITS ON SHORTER SIDE |
| --- | --- | --- | --- |
| SLIT NUMBER SUPPLIED BY ¼ MODEL | LONGER SIDE | — | All |
|  | SHORTER SIDE | — | 1 (50%) |
| FLOW RATE DEVIATION OF CELL | MAXIMUM | % | 109.4 |
|  | MINIMUM | % | 95.8 |

In the simulation model (¼ model) illustrated in FIG. 8, 16 cell tubes 12 are arranged on the longer side and 4.5 cell tubes 12 are arranged on the shorter side; and 20 slits 41a are arranged on the longer side and 4 slits 41a are arranged on the shorter side. Note that the holes 25 and 26 are provided to pass a current collector member.

A pressure 0.33 Mpa, a flow rate 0.0052 Kg/s, and a temperature 500° C. are set as the air flow conditions for the simulation. The calculation results for the cases 1 to 10 shown in Table 1 are illustrated in FIG. 7.

According to this calculation results, in calculation case 1 for supplying air from the entire circumference (all slits 41a provided on the longer side and the shorter side), the maximum deviation is 120.8% and the minimum deviation is 91.8%. In contrast, in calculation case 8, the maximum deviation is 108.4% and the minimum deviation 95.2%, that is, the flow rate deviation is −4.8 to 8.4%, which indicates that air with a small deviation is uniformly supplied in comparison with case 1. In calculation case 10, the maximum deviation is 109.4% and the minimum deviation is 95.8%, that is, the flow rate deviation is −4.2% to 9.4%, which substantially similarly indicates that air with a small deviation is uniformly supplied.

In calculation case 8, the slits 41a for supplying air are provided all slits on the longer side and one slit on the shorter side (slit number 1 in a shorter side direction). Thus, in an actual fuel cell 10, the slits 41a are provided all on both longer sides, and the slits 41a are provided, two for each, on a center portion on both shorter sides.

In calculation case 10, the slits 41a for supplying air are provided all slits on the longer side and 0.5 slits (slit number 1 in a shorter side direction) on the shorter side. Thus, in an actual fuel cell 10, as described in the above embodiment, the slits 41a are provided all on both longer sides, and the slits 41a are provided, one for each, on a center portion on both shorter sides.

Note that according to the calculation results, in the case of supplying air from all slits 41a provided on the longer side, calculation case 8 and case 10 show good results in comparison with calculation case 2 in which air is not supplied from the shorter side. Thus, it is understood that the slits 41a on the shorter side are effective in uniformization.

As described above, the placement of the slits 41a like calculation case 8 and case 10 can uniformly supply air to the cell tubes 12 in the electric power generating chamber 17, thereby to be able to prevent damage in the air electrode and temperature deviation between the cell tubes.

Further, the above described lower portion of the fuel cell 10 is configured as a double box structure so as to be able to supply air from the lower portion of the bulkhead 11 without securing a large space, and thus to be able to prevent flow disturbance for rectifying with a Reynolds number equal to or less than about 3000 (Re≧3000).

The above described fuel cell 10 is configured as a double box structure in which the fuel discharge header 20 is placed and installed in a recessed portion of the support frame 30 serving as the lower surface of the bulkhead 11 to form the air supply passage 40 between the wall surfaces, and further the above described air flow hole 41 is provided to supply air from the lower portion of the bulkhead 11 to the air supply header 22 through the air supply passage 40 and the air flow hole 41 and the fuel gas in the fuel discharge header 20 is discharged from the lower portion of the bulkhead 11 through the fuel discharge pipe 21 penetrating through the support frame 30, thereby enabling the air (oxidant) supply method.

This makes it possible to eliminate the air supply pipe 36 and the fuel discharge pipe 21 from the side surface of the bulkhead 11 and to narrow the interval of the adjacent fuel cells 10, thereby to be able to reduce the installation space.

Thus, the above described present embodiment eliminates the need of a complicated manifold such as air pipes, thereby facilitating precision control at assembly and reducing the installation space for the fuel cells 10 to reduce the size of the SOFC.

Further, the air can be uniformly supplied into the electric power generating chamber 17, thereby to be able to prevent or suppress the air electrode from being damaged and to improve the reliability and the durability.

Hereinafter, an embodiment of the fuel cell and the oxidant discharge method according to the present invention will be described based on the accompanying drawings. It should be noted that the same reference numerals or characters are assigned to the components common to the above described embodiment and the detailed descriptions thereof are omitted.

In the present embodiment, as shown in FIG. 1, the lower tube plate 14 of the fuel cell 10 is a plate-like member arranged on a lower side (under in FIG. 1) in the longitudinal direction and forms the lower surface member of the air supply header 22 together with the upper surface member of the fuel discharge header 20. The lower tube plate 14 is a member that seals the upper end portion of the air supply passage 40 to enable air to flow between the air supply header 22 and the air supply passage 40 through the air flow holes 41.

The air supply port 34 and the air supply nozzle 35 have a diameter larger than that of the fuel discharge pipe 21. Thus, the air introducing space portion 37 having a ring-like cross-sectional shape and guiding air supplied from the air supply pipe 36 to the air supply header 22 is formed between an outer peripheral surface of the fuel discharge pipe 21 and an inner peripheral surface of the air supply nozzle 35. The air introducing space portion 37 is communicatively connected to a space of the air supply passage 40 formed between an inner peripheral surface of the support frame 30 and an outer peripheral surface of the fuel discharge header 20 through the air supply port 34. Therefore, the air supplied from the air supply pipe 36 flows from the air introducing space portion 37 into the air supply passage 40 formed on an outer periphery (bottom surface and side surface) of the fuel discharge header 20, and further the air supplied to the air supply header 22 through the air flow holes 41.

Figure 9:
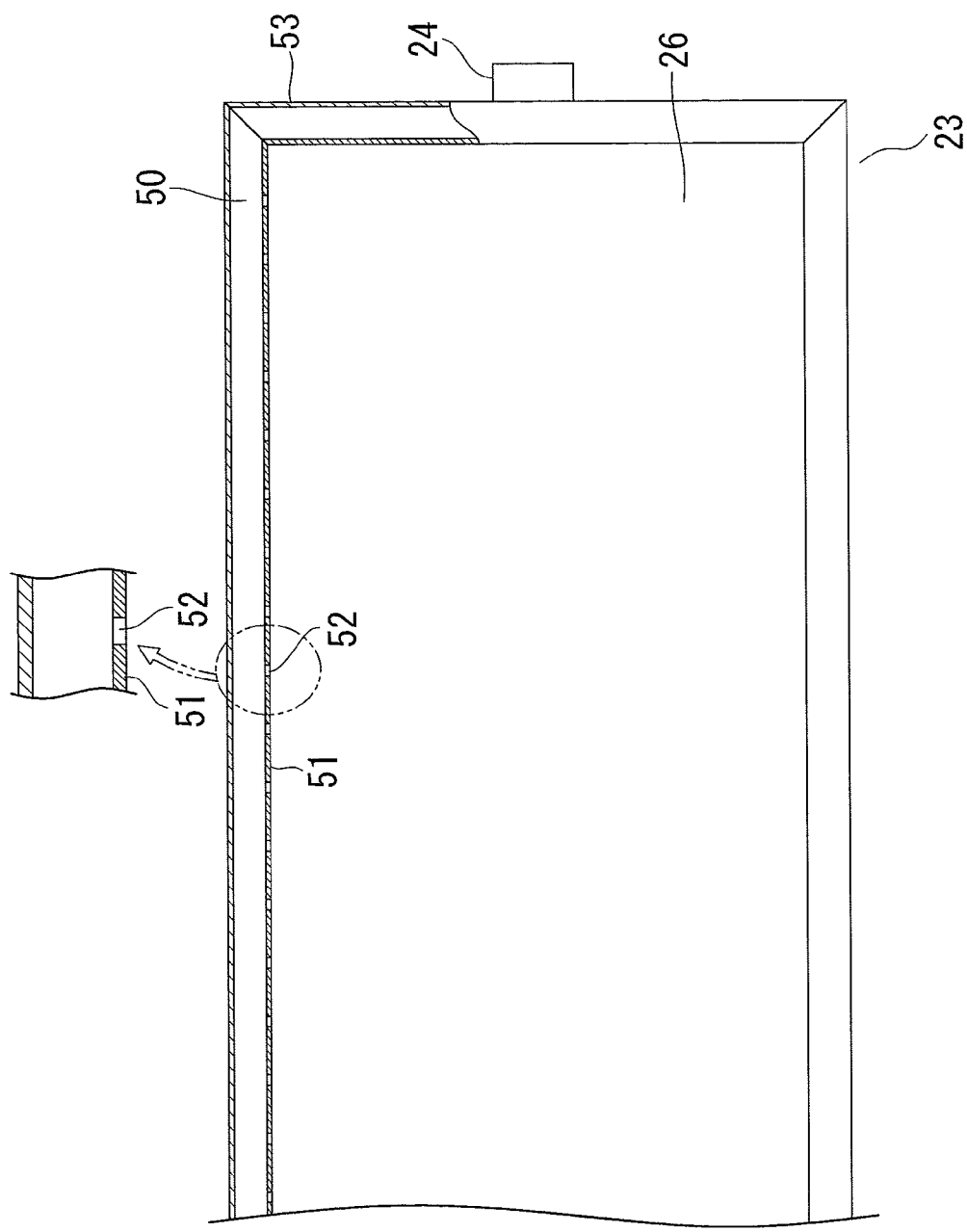
FIG. 9 is a perspective view illustrating a duct (discharge passage) installed in the air discharge header of the fuel cell illustrated in FIG. 1.
Figure 10:
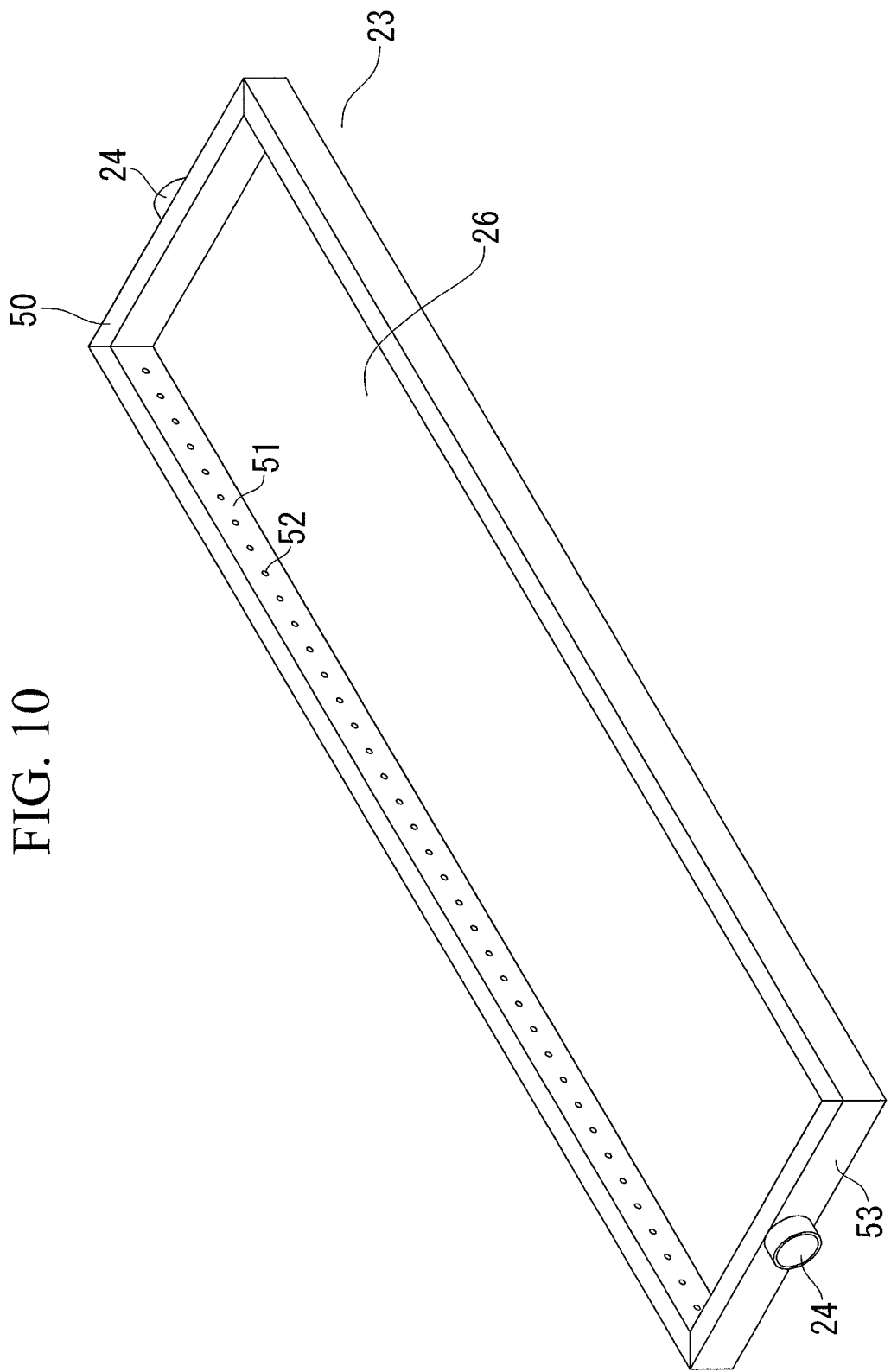
FIG. 10 is a plan view (partial sectional view) illustrating the duct (discharge passage) illustrated in FIG. 9.

The air discharge header 23 according to the present embodiment has a substantially rectangular horizontal cross-sectional shape in which a picture frame like duct (discharge passage) 50 as illustrated in FIGS. 9 and 10 is provided on an outer periphery of the air discharge header 23. The duct 50 is a flow path having a rectangular cross section and formed so as to be communicatively connected to each other along the four sides inside the air discharge header 23. Specifically, the air discharge header 23 forms an inner space 26 with an inner wall surface 51 of the duct 50 and the air discharge header 23 is airtightly fixed to a first upper heat insulator 15A and a second upper heat insulator 15B arranged above and below thereof.

An introduction hole 52 penetrating through a wall surface member is provided on a longer side (first opposing side surface) of the inner wall surface 51 in the duct 50. In the configuration example of FIG. 10, a large number of introduction holes 52 are provided at an equal pitch in the longitudinal direction of the inner wall surface 51.

An air discharge pipe 24 is connected to a shorter side (second opposing side surface) of an outer wall surface 53.

The porosity of the above described introduction hole 52 is set to a value for rectifying by giving pressure loss to the air flow inside the electric power generating chamber 17. Specifically, the outlet of the air flowing from the electric power generating chamber 17 into the air discharge header 23 through the holes 15a is the introduction holes 52 provided only on the longer side of the inner wall surface 51 of the duct 50, and thus the porosity is small. Here, the porosity is a value calculated using the area of the inner wall surface 51 of the air discharge header 23 as the denominator and the total area of the introduction holes 52 as the numerator. Thus, the introduction hole 52 having a small porosity gives a large pressure loss to the air flowing therethrough, thereby reducing the flow rate of the air flowing inside the electric power generating chamber 17 for rectifying.

The introduction holes 52 according to the present embodiment are a plurality of circular through-holes so as to have a predetermined porosity, but may be through-holes having a shape such as a rectangle other than a circle. Alternatively, the introduction holes 52 may be one or a plurality of long slits so as to have a predetermined porosity.

Specifically, a plurality of circular or rectangular through-holes or one or a plurality of long slits in a longitudinal direction may be provided so that the porosity of the introduction holes 52 is a value within a predetermined range, and a preferred porosity is about 4% allowed to ensure pressure loss.

The introduction holes 52 and the air discharge pipe 24 may be provided on a different side surface in the air header. The introduction holes 52 are provided by drilling in an inner wall of the side surface on the longer side of the duct 50. Meanwhile, the air discharge pipe 24 is installed on an outer wall of the side surface on the shorter side. The introduction holes 52 and the air discharge pipe 24 may be provided each on both sides of the opposing side surfaces.

In the present embodiment, regarding the above described duct 50 and the introduction hole 52, the flow rate deviation (air mass flow rate) for each cell tube 12 in the electric power generating chamber 17 is calculated by changing the diameter of the introduction hole 52. This simulation calculation assumes the ¼ model of the fuel cell 10 as an example condition thereof such that the size of the inner wall surface 51 is 520 mm wide and 45 mm high. A pressure of 0.33 Mpa, a flow rate of 18.75 Kg/hr, and a temperature of 500° C. are set as the air flow conditions.

As a comparative example, an air discharge portion is provided on one side surface on the shorter side of the air discharge header and a U-shaped member (channel material) having a side wall is provided on the other side surfaces. In this case, there is nothing to substantially give pressure loss in the air flow path. Thus, the oxidant tends to flow directly toward the side surface having the air discharge portion, resulting in a large flow rate deviation from a minimum deviation of 53.6% to a maximum deviation of 292%.

In contrast to this, the present embodiment calculates the similar flow rate deviations of three cases (introduction hole diameters: 4.3 mm, 4 mm, and 3 mm) by changing the diameter of the introduction hole 52 provided on the inner wall surface 51 on the longer side of the duct 50. Note that the ¼ model assumes that 20.5 introduction holes 52 are arranged in a row on the inner wall surface 51 having a lateral size of 520 mm.

As a result, in the case of an introduction hole diameter of 4.3 mm, the minimum deviation is 91.2% and the maximum deviation is 111.4%; in the case of an introduction hole diameter of 4 mm, the minimum deviation is 90.9% and the maximum deviation is 111.3%; and in the case of an introduction hole diameter of 3 mm, the minimum deviation is 90.5% and the maximum deviation is 111.9%.

Therefore, it is understood that the configuration of providing the introduction holes 52 on the inner wall surface 51 of the longer side can reduce the flow rate deviation of the air flowing inside the electric power generating chamber 17 and can provide uniform air rate for each cell tube 12.

Further, findings were obtained that even a reduction in diameter of the introduction hole 52 to equal to or less than 4 mm simply increases the pressure loss and rectification due to an improvement in flow rate deviation was not observed. Thus, the number of holes may be controlled so that the introduction hole 52 with a diameter of 4 mm has an open area ratio of about 4%.

As described above, according to the fuel cell 10 of the present embodiment, the duct 50 having a box-shaped cross section and formed so as to be communicatively connected to each other along the four wall surfaces of the air discharge header 23 having a substantially rectangular horizontal cross-sectional shape includes the introduction holes 52 penetrating through the inner wall surface 51 on the longer side and the air discharge pipe 24 connected to the outer wall surface 53 on the shorter side. Thus, the air that is used to generate electric power and then flows from the electric power generating chamber 17 to the air discharge header 23 flows from the introduction holes 52 provided on the inner wall surface 51 on the longer side into the duct 50. The air passes through inside the duct 50 into the air discharge pipe 24 connected to the outer wall surface 53 on the shorter side, and finally flows out from the air discharge pipe 24 to outside.

Such an air discharge passage gives pressure loss to the air passing through the introduction holes 52 having a small cross section, resulting in uniform flow of the air flowing from the electric power generating chamber 17 to the air discharge header. Thus, the air flowing inside the electric power generating chamber 17 is a substantially uniform and rectified flow in the horizontal cross section. This results in uniform supply of air for each cell tube 12 in the electric power generating chamber 17, thereby to be able to prevent or suppress a temperature distribution and an oxygen concentration distribution from occurring in the electric power generating chamber 17.

As a result, the fuel cell 10 can discharge air by effectively using the limited space in the upper portion, can sufficiently exhibit the performance to efficiently generate electric power, and further can prevent damage due to a low oxygen concentration to improve the reliability and the durability.

Further, the fuel cell 10 according to the above described embodiment introduces the fuel gas from the fuel supply header 18 into the cell tubes 12 to be discharged to the fuel discharge header 20, and introduces air from the air supply header 22 to the electric power generating chamber 17 to flow through outside the cell tubes 12 toward the air discharge header 23 upward from below to cause the fuel gas and the oxidant air to be electrochemically reacted to generate electric power. The following air (oxidant) discharge method can be adopted for such a fuel cell 10.

Specifically, the air discharge method of the fuel cell 10 is for providing, by vertically partitioning an interior of the bulkhead 11, the fuel supply header 18, the air discharge header 23, the electric power generating chamber 17, the air supply header 22, and the fuel discharge header 20, from top to bottom; opening a plurality of cell tubes 12 vertically penetrating through the electric power generating chamber 17 in the bulkhead 11 such that an upper end of each of the fuel cell tubes is opened in the fuel supply header 18 and a lower end of each of the fuel cell tubes is opened in the fuel discharge header 20; and forming the duct 50 having a box-shaped cross section and communicatively connected to each other along the four wall surfaces of the air discharge header 23 having a substantially rectangular horizontal cross-sectional shape.

Further, the air discharge method is for passing air from the introduction holes 52 provided to penetrate through the inner wall surface 51 serving as the longer side of the duct 50, and then causing the duct 50 to guide the air from the longer side to the shorter side to be discharged from the air discharge pipe 24 connected to the outer wall surface 53 on the shorter side.

According to such an air discharge method, when the air that is used to generate electric power and then flows from the electric power generating chamber 17 to the air discharge header 23 passes through the introduction holes 52 having a small cross section, pressure loss is given to the air, resulting in an uniform flow of the air flowing from the electric power generating chamber 17 to the air discharge header. Accordingly, the air flow inside the electric power generating chamber 17 can be rectified and the air can be uniformly supplied for each cell tube 12.

In other word, the air discharge method is for effectively using the limited space in the upper portion of the fuel cell 10 to discharge air, can sufficiently exhibit the performance to efficiently generate electric power, and further can prevent damage due to a low oxygen concentration to improve the reliability and the durability.

It should be noted that the present invention is not limited to the aforementioned embodiments, but various modifications can be appropriately made to the present invention without departing from the spirit and scope of the present invention.

REFERENCE SIGNS LIST 10 fuel cell (fuel cell module)
11 bulkhead (container)
12 cell tube (fuel cell tube, electric power generation cell)
13 upper tube plate (partition member)
14 lower tube plate (partition member)
15 upper heat insulator
16 lower heat insulator
17 electric power generating chamber
18 fuel supply header (fuel supply chamber)
20 fuel discharge header (fuel discharge chamber, first space)
20a flange portion
21 fuel discharge pipe
22 air supply header (air supply chamber)
23 air discharge header (air discharge chamber, oxidant header)
24 air discharge pipe (discharge pipe)
30 support frame (gas flow path portion)
31 side wall
31a side wall flange portion
32 bottom surface
33 stepped portion
40 air supply passage (space, second space)
41 air flow hole (oxidant flow path)
41a slit
50 duct (discharge passage)
51 inner wall surface
52 introduction hole
53 outer wall surface

The invention claimed is:

1. An oxidant discharge method of a fuel cell for introducing a fuel gas from a fuel supply chamber to an inside of a fuel cell tube to be discharged to a fuel discharge chamber; introducing an oxidant from an oxidant supply chamber into an power generating chamber to flow the oxidant upward from below through an outside of the fuel cell tube toward an oxidant discharge chamber, and then causing the fuel gas and the oxidant to be electrochemically reacted to generate power, the method comprising:
   providing, by partitioning an interior of a container in a vertical direction, the fuel supply chamber, the oxidant discharge chamber, the power generating chamber, the oxidant supply chamber, and the fuel discharge chamber in order, from top to bottom;
   opening a plurality of the fuel cell tubes penetrating the power generating chamber in a vertical direction inside the container such that an upper end of each of the fuel cell tubes is opened in the fuel supply chamber and a lower end of each of the fuel cell tubes is opened in the fuel discharge chamber; and
   forming a discharge passage which is connected with the oxidant discharge chamber communicatively connected to each other, and passing the oxidant from an introduction hole provided to penetrate a longer side inner wall surface of the discharge passage to be discharged from a discharge pipe connected to a shorter side outer wall surface,
   wherein the oxidant discharge chamber has a substantially rectangular horizontal cross-sectional shape, and
   wherein the discharge passage has a box-shaped cross section which is divided by an inner wall surface from the an inner space of the oxidant discharge chamber, and
   wherein the discharge passage is provided along outer periphery four wall surfaces of the oxidant discharge chamber.

2. The oxidant discharge method according to claim 1, wherein a porosity of the introduction hole is set to a value for rectifying by giving pressure loss to an air flow inside the power generating chamber.

3. The oxidant discharge method according to claim 1, wherein the oxidant discharge chamber is airtightly fixed to a first upper heat insulator and a second upper heat insulator arranged above and below thereof.

4. The oxidant discharge method according to claim 1, further comprising supplying air to each of the fuel cell tubes in a uniform manner.

5. The oxidant discharge method according to claim 1, further comprising imparting a pressure loss to the air that is utilized to generate electric power that subsequently flows from the electric power generating chamber to the air discharge chamber.

\* \* \* \* \*